United States Patent [19]

Kugele et al.

[11] 4,391,757
[45] Jul. 5, 1983

[54] ORGANIC ANTIMONY CONTAINING STABILIZER COMPOSITIONS FOR HALOGENATED POLYMERS

[75] Inventors: Thomas G. Kugele; Dennis W. Gilmore, both of Cincinnati, Ohio

[73] Assignee: Carstab Corporation, Reading, Ohio

[21] Appl. No.: 325,512

[22] Filed: Nov. 27, 1981

[51] Int. Cl.³ ............................................. C09K 15/32
[52] U.S. Cl. .................................. 260/446; 252/406; 524/80; 524/177; 524/289; 524/301; 524/302; 524/303; 524/305
[58] Field of Search ................ 252/406; 524/177, 289, 524/302, 303, 305, 301, 80; 260/446

[56] References Cited

U.S. PATENT DOCUMENTS

| | | | |
|---|---|---|---|
| 2,245,500 | 6/1941 | Rein et al. | 524/80 |
| 2,680,726 | 6/1954 | Weinberg et al. | 260/30.6 |
| 2,684,956 | 7/1954 | Weinberg et al. | 260/31.8 |
| 3,340,285 | 9/1967 | Remes et al. | 260/446 |
| 3,399,220 | 8/1968 | Remes et al. | 260/446 |
| 3,530,158 | 9/1970 | Leebrick et al. | 260/446 |
| 3,887,508 | 6/1975 | Dieckmann | 260/23 X A |
| 3,919,168 | 11/1975 | Dieckmann | 524/177 |
| 4,029,618 | 6/1977 | Dieckmann | 524/177 |
| 4,115,352 | 9/1978 | Bohen et al. | 524/177 |
| 4,256,618 | 3/1981 | Brecker et al. | 260/23 X A |
| 4,269,731 | 5/1981 | Mack | 252/400 R |
| 4,279,806 | 7/1981 | Muldrow | 524/301 |
| 4,287,118 | 9/1981 | Muldrow | 524/301 |
| 4,336,168 | 6/1982 | Hoch et al. | 524/302 |

FOREIGN PATENT DOCUMENTS 54-151920 11/1979 Japan .

*Primary Examiner*—V. P. Hoke
*Attorney, Agent, or Firm*—Gerald K. White; Richard J. Sheridan

[57] ABSTRACT

In accordance with this invention there are provided organic antimony stabilizer compositions effective in stabilizing halogen containing organic polymers against the deteriorative effects of heat comprising (1) at least one organic antimony compound having at least one antimony to sulfur to carbon (i.e. Sb-S-C) linkage, (2) elemental sulfur, and (3) at least one 2-mercaptocarboxylic acid. Said 2-mercaptocarboxylic acid and elemental sulfur also serve to provide hydrolytic and UV light stability to the antimony compound per se. Also provided are stabilized organic polymer compositions comprising a halogen containing polymer and said organic antimony stabilizer composition.

4 Claims, No Drawings

ORGANIC ANTIMONY CONTAINING STABILIZER COMPOSITIONS FOR HALOGENATED POLYMERS

FIELD OF THE INVENTION

This invention relates to an improved organic antimony stabilizer composition for use in stabilizing a halogen containing polymer and to a halogen containing polymer composition having incorporated therein such improved organic antimony stabilizer composition. Further, this invention relates to an organic antimony stabilizer composition, for stabilizing a halogen containing polymer, that has improved stabilizing activity and greater storage stability.

BACKGROUND OF THE INVENTION

Many organic polymers, more particularly halogen containing organic polymers are conveniently and economically processed into useful articles of commerce by methods employing heat to melt or soften the polymer. The use of such heat can be and often is detrimental to the polymer, especially where the polymer is exposed to high (e.g. 350° to 400° F.) processing temperatures for any extended period of time (e.g. several minutes up to about 30 minutes). It is well known that many organic polymers, including halogen containing organic polymers, will undergo color changes and various other physical changes upon exposure to high temperatures over a period of time unless properly protected. The color change is gradual but visually perceptable during short (e.g. 1 to 8 minutes) term exposure to high processing temperatures. However, with extended (e.g. 10 to 30 minutes) exposure to high processing temperatures the change in color accelerates and becomes greater in intensity. Color changes occuring during the first several minutes (e.g. 1 to 5 minutes) of exposure to high processing temperatures are commonly referred to as early color or early discoloration. Avoidance of such early color or early discoloration is notably important in a number of applications (e.g. plastic pipe) and is particularly important where white or light colored products are to be produced. It is of course also important to prevent or reduce discoloration and deterioration of the organic polymer during extended exposure to high processing temperatures as may be encountered in some processes or fabricating methods.

To prevent or reduce the discoloration and deterioration of organic polymers, more particularly thermoplastic organic polymers, during processing at elevated temperatures and during exposure of the fabricated product to elevated temperatures under use conditions the art has added various materials to the polymers. Among these materials added to the polymer are substances referred to as stabilizers. Included among these stabilizers used by the art are organic antimony compounds [e.g. antimony tris (alkyl mercaptide)]. Although various organic antimony compounds have been taught in the art for heat stabilizing organic polymers, more particularly halogen containing polymers and still more particularly vinyl halide polymers (e.g. PVC), the organic antimony compounds as heat stabilizers have been found to be less effective than many other stabilizers (e.g. organotin stabilizers). This lower effectiveness in heat stabilizing organic polymers, particularly vinyl halide polymers, has made the organic antimony compounds of the art unattractive for commercial application, even though in many instances organic antimony compounds have a cost advantage over other stabilizers. Thus, there continues to exist a need and advantage for improving the stabilizing effectiveness of organic antimony stabilizers.

A number of the well-known organic antimony stabilizers are unstable to moisture and light (e.g. ultraviolet light). This instability toward moisture and light is particularly noted with organic antimony stabilizers having an antimony to sulfur to carbon (i.e. Sb-S-C) bond [e.g. antimony tris (isooctylthioglycolate)]. On exposure of the organic antimony stabilizer to water (e.g. moisture) there are often formed insoluble or incompatible products thereby producing a heterogeneous organic antimony stabilizer composition and reducing the effectiveness of the organic antimony stabilizer in heat stabilizing an organic polymer, particularly a vinyl halide polymer. This heterogeneity and reduced effectiveness in heat stabilizing organic polymers contributes to making such stabilizers less useful and commercially unattractive. Organic antimony stabilizers can upon exposure to ultraviolet (U.V.) light discolor and/or form a precipitate thereby indicating deterioration of the organic antimony stabilizer. In some cases the discoloration and/or precipitation, upon exposure to UV light, occurs within from one to a few hours. This discoloration and/or precipitation seriously impairs the usefulness and acceptability of such organic antimony stabilizers. It is therefore desirable to overcome these disadvantages and provide highly stable and highly effective organic antimony stabilizers. Desirably, it would be highly advantageous to both overcome the stability disadvantages and the lower stabilizing activity of the art organic antimony stabilizers.

SUMMARY OF THE INVENTION

It is therefore an object of this invention to overcome the disadvantages of the prior art and to provide a highly stable and highly effective organic antimony stabilizer composition for stabilizing organic polymers, more particularly halogen containing organic polymers. A further object of this invention is to provide an organic antimony stabilizer composition which is highly resistant to deterioration caused by UV light and/or moisture.

These and other objects, as will become apparent from the description and claims herein, have been found to be accomplished by the organic antimony stabilizer composition of this invention comprising (1) at least one organic antimony compound having at least one antimony-sulfur-carbon linkage, (2) elemental sulfur, and (3) at least one 2-mercaptocarboxylic acid.

DESCRIPTION OF THE INVENTION

There has now been unexpectedly found in accordance with this invention an advantageous organic antimony stabilizer composition that is resistant to deterioration in the presence of UV light and/or moisture. Further, there unexpectedly has been found in accordance with this invention a stable organic antimony stabilizer composition of improved effectiveness in stabilizing a halogen containing organic polymer, more particularly against heat. Organic polymer (e.g. halogen containing organic polymer) compositions having improved resistance to color change, more especially early color change, upon exposure to heat during processing are also provided in the practice of this invention.

In accordance with this invention there is provided (a) an organic antimony stabilizer composition comprising (1) at least one organic antimony compound having at least one antimony to sulfur to carbon (i.e. Sb-S-C) linkage, (2) elemental sulfur, and (3) at lest one 2-mercaptocarboxylic acid, and (b) an organic polymer composition comprising a halogen containing organic polymer and an organic antimony stabilizer composition comprising (1) at least one organic antimony compound having at least one antimony to sulfur to carbon linkage, (2) elemental sulfur, and (3) at least one 2-mercaptocarboxylic acid. As used herein the term 2-mercaptocarboxylic acid shall mean a monobasic or polybasic organic acid having a mercaptan (i.e. —SH) group attached to an acyclic carbon atom that is adjacent to at least one of the carboxylic acid groups of the organic acid. The organic antimony stabilizer composition of this invention comprises (1) at least one organic antimony compound selected from compounds having the formulas:

and

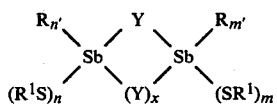

wherein

R is selected from the group consisting of alkyl, aryl, cycloalkyl, cycloalkenyl, aralkyl, alkaryl, and alkenyl;

$R^1$ is selected from the group consisting of alkyl, aryl, cycloalkyl, cycloalkenyl, aralkyl, alkaryl, alkenyl, $$-(CH_2)_z-COOR^2 \text{ and } -(CH_2)_a-OCR^3;$$

$R^2$ is hydrogen, alkyl, aryl, alkenyl, cycloalkyl or alkoxyalkyl;

$R^3$ is alkyl, aryl, cycloalkyl or alkenyl;

Y is selected from the group consisting of

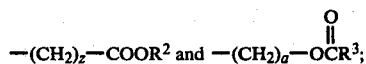

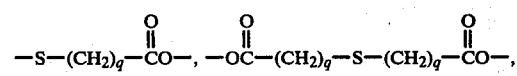

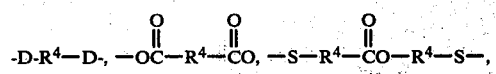

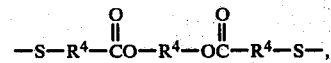

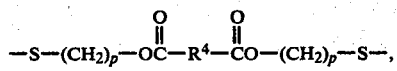

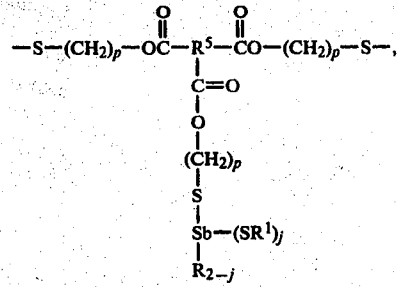

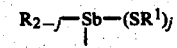

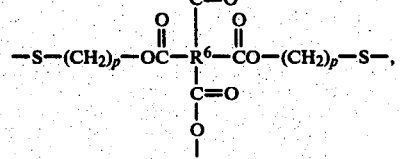

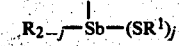

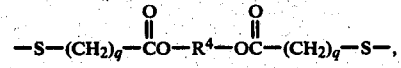

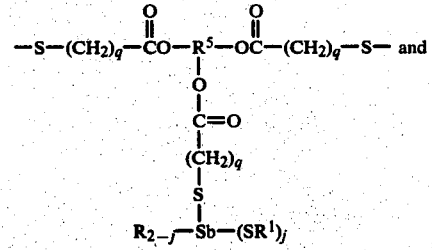

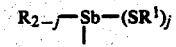 and

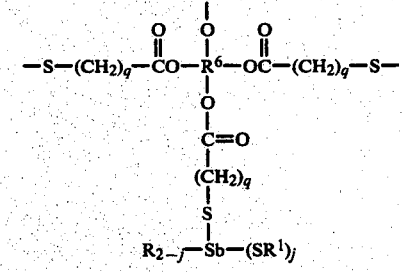

$R^4$ is alkylene, arylene or alkenylene;
$R^5$ is a trivalent alkyl or aryl radical;
$R^6$ is a tetravalent alkyl or aryl radical;
D is oxygen or sulfur;
i = 1, 2 or 3;
j = 1 or 2;
m = 1 or 2 and m' = 0 or 1;
n = 1 or 2 and n' = 0 or 1;

x is 0 or 1 with the proviso that when x=0 then m+m'=2 and n+n'=2, and when x=1 then m=1, m'=0, n=1 and n'=0;
z is 1, 2 or 3;
a is 2, 3 or 4;
q is 1, 2 or 3; and
p is 2, 3 or 4;

(2) elemental sulfur and (3) at least one 2-mercaptocarboxylic acid selected from compounds having the formula:

$$R^{10}-\underset{\underset{SH}{|}}{\overset{\overset{R^9}{|}}{C}}-COOH \qquad (III)$$

where $R^9$ and $R^{10}$ are the same or different and are selected from hydrogen, alkyl, aryl, aralkyl, alkaryl, cycloalkyl, alkenyl, carboxyl,

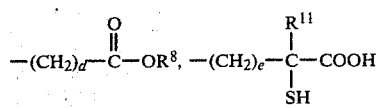

where $R^8$ is hydrogen, alkyl, aryl, aralkyl, alkaryl, cycloalkyl, cycloalkenyl, or alkenyl; $R^{11}$ is hydrogen, alkyl or aryl; d is 1 to 6 and e is 1 to 10; or $R^9$ and $R^{10}$ together form an alicyclic ring.

As used herein, the term alkyl represents straight or branched chain, saturated hydrocarbon radicals containing, for example, 1 to 20 carbon atoms, preferably 1 to 8 carbon atoms. The term aryl refers to $C_6$-$C_{10}$ aromatic rings such as benzene and naphthalene, and preferably benzene. The term alkenyl refers to monovalent straight or branched chain $C_2$ to $C_{20}$ hydrocarbon radicals containing one or more carbon-carbon double bonds. The term aralkyl represents a monovalent $C_1$ to $C_{20}$ hydrocarbon radical having attached thereto an aryl radical. The term alkaryl refers to monovalent aryl radicals having attached thereto at least one $C_1$-$C_{20}$ alkyl group. The term cycloakyl represents monovalent $C_3$-$C_8$ saturated cycloaliphatic radicals, preferably cyclohexane, and the term cycloalkenyl represents $C_5$-$C_8$ cycloaliphatic radicals containing at least one carbon-carbon double bond. The term alkylene refers to divalent, straight or branched chain hydrocarbon radicals containing, for example, 1 to 20 carbon atoms. The term arylene refers to divalent $C_6$-$C_{10}$ aromatic rings. The term alkenylene represents divalent, straight or branched chain $C_2$ to $C_{20}$ hydrocarbon radicals containing at least one carbon-carbon double bond. The term alkoxyalkyl refers to monovalent, $C_2$ to $C_{20}$ alkoxyalkyl radicals.

The preferred organic antimony compounds of formulae (I) and (II) are those wherein $R^1$ is selected from $C_1$-$C_{18}$ alkyl, phenyl, cyclohexyl,

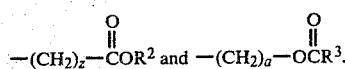

More preferred are those compounds wherein $R^1$ is

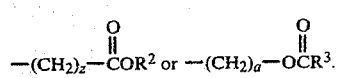

Still more preferred are the compounds wherein $R^1$ is

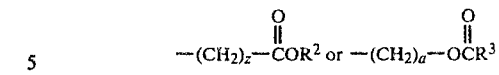

wherein $R^2$ and $R^3$ are $C_1$-$C_{20}$ alkyls or $C_2$-$C_{20}$ alkenyl. In accordance with formula (I), i is 1, 2, or 3, preferably 2 or 3, more preferably 3. Where the organic antimony compound is according to formula (II), m and n are preferably 2, x is preferably 0, q is preferably 1 or 2 and p is preferably 2 or 3.

An organic polymer composition having unexpected improved resistance to heat, comprising a halogen containing organic polymer, preferably a homopolymer or copolymer of a vinyl halide monomer, and an organic antimony stabilizer composition comprising (1) an organic antimony compound having formula (I) or (II), (2) elemental sulfur and (3) at least one 2-mercaptocarboxylic acid selected from compounds having formula (III) is provided in accordance with this invention.

As organic antimony compounds according to formula (I) that may be usable in the practice of the organic antimony stabilizer composition and the organic polymer composition of this invention there include, but are not limited to, compounds wherein R, $R^1$ and i of formula (I) are as shown in Table I.

TABLE I

| R | $R^1$ | i |
|---|---|---|
| — | $-CH_2-\overset{O}{\underset{\|}{C}}OC_8H_{17}$ | 3 |
| — | $-CH_2-\overset{O}{\underset{\|}{C}}OCH_3$ | 3 |
| — | $-(CH_2)_2\overset{O}{\underset{\|}{C}}OC_4H_9$ | 3 |
| — | $-CH_2\overset{O}{\underset{\|}{C}}OC_{18}H_{37}$ | 3 |
| — | $-(CH_2)_3\overset{O}{\underset{\|}{C}}OC_6H_{13}$ | 3 |
| — | $-(CH_2)_2O\overset{O}{\underset{\|}{C}}-C_{17}H_{35}$ | 3 |
| — | $-(CH_2)_3O\overset{O}{\underset{\|}{C}}-C_7H_{15}$ | 3 |
| — | $-(CH_2)_2O\overset{O}{\underset{\|}{C}}-C_3H_7$ | 3 |
| $C_4H_9$ | $-(CH_2)_2\overset{O}{\underset{\|}{C}}OC_{12}H_{25}$ | 2 |
| $C_6H_5$ | $-CH_2\overset{O}{\underset{\|}{C}}OC_8H_{17}$ | 2 |
| $C_8H_{17}$ | $-(CH_2)_2\overset{O}{\underset{\|}{C}}OCH_3$ | 2 |
| $C_6H_5-CH_2-$ | $-(CH_2)_2O\overset{O}{\underset{\|}{C}}-C_5H_{11}$ | 2 |

TABLE I-continued

| R | R¹ | i |
|---|---|---|
| $C_6H_{13}$ | $-(CH_2)_3OC(=O)-C_{17}H_{33}$ | 2 |
| — | $-C_2H_5$ | 3 |
| — | $-C_4H_9$ | 3 |
| — | $-C_8H_{17}$ | 3 |
| — | $-C_{12}H_{25}$ | 3 |
| — | $-C_{18}H_{35}$ | 3 |
| $CH_3$ | $-C_8H_{17}$ | 1 |
| $C_8H_{17}$ | $-C_{18}H_{35}$ | 2 |
| — | $-C_6H_5$ | 3 |
| — | $-CH_2-(C_6H_5)$ | 3 |
| $-C_4H_9$ | $-(C_6H_4)CH_3$ | 2 |

Organic antimony compounds according to formula (II) that may be used in the practice of the organic antimony stabilizer composition and the organic polymer composition of this invention include, but are not limited to, compounds wherein R, R¹, Y, m, m', n, n' and x of formula (II) are as shown in Table II.

TABLE II

| n | m | n' | m' | x | R | R¹ | Y |
|---|---|----|----|---|---|----|---|
| 2 | 2 | 0 | 0 | 0 | — | $-C_5H_{11}$ | $-S-C_4H_8-S-$ |
| 2 | 2 | 0 | 0 | 0 | — | $-CH_2COOC_4H_9$ | $-S-C_{12}H_{24}-S-$ |
| 2 | 2 | 0 | 0 | 0 | — | $-(CH_2)_2OOC-C_{17}H_{35}$ | $-S-C_6H_4-S-$ |
| 2 | 2 | 0 | 0 | 0 | — | $-(CH_2)_2COOC_8H_{17}$ | $-S-CH_2C(=O)C_2H_4OC(=O)CH_2-S-$ |
| 2 | 2 | 0 | 0 | 0 | — | $-C_{12}H_{25}$ | $-S-(CH_2)_2C(=O)O-C_3H_6OC(=O)(CH_2)_2-S-$ |
| 1 | 1 | 1 | 1 | 0 | $-CH_3$ | $-(CH_2)_3C(=O)OC_{12}H_{25}$ | $-S-CH_2C(=O)O-C_6H_4OC(=O)CH_2-S-$ |
| 1 | 1 | 1 | 1 | 0 | $-C_8H_{17}$ | $-CH_2C(=O)OC_6H_5$ | $-S-(CH_2)_3C(=O)O-C_8H_{16}OC(=O)(CH_2)_3-S-$ |
| 2 | 2 | 0 | 0 | 0 | — | $-S-CH_2C(=O)OC_8H_{17}$ | $-S-CH_2C(=O)O-$ |
| 2 | 2 | 0 | 0 | 0 | — | $-S-CH_2C(=O)OC_{18}H_{37}$ | $-S-(CH_2)_2C(=O)O-$ |
| 2 | 2 | 0 | 0 | 0 | — | $-S-(CH_2)_2C(=O)OC_4H_9$ | $-S-(CH_2)_3C(=O)O-$ |
| 2 | 2 | 0 | 0 | 0 | — | $-S-(CH_2)_3C(=O)OC_{12}H_{25}$ | $-S-CH_2C(=O)O-$ |
| 1 | 1 | 0 | 0 | 1 | — | $-S-CH_2C(=O)OC_6H_5$ | $-S-(CH_2)_2C(=O)O-$ |
| 2 | 2 | 0 | 0 | 0 | — | $-S-CH_2C(=O)OCH_2C_6H_5$ | $-S-CH_2C(=O)O-$ |
| 2 | 2 | 0 | 0 | 0 | — | $-S-CH_2C(=O)OC_6H_4CH_3$ | $-S-CH_2C(=O)O-$ |
| 2 | 2 | 0 | 0 | 0 | — | $-C_8H_{17}$ | $-S-(CH_2)_2C(=O)O-$ |
| 1 | 1 | 1 | 1 | 0 | $-CH_3$ | $-S-CH_2C(=O)OC_6H_{13}$ | $-S-CH_2C(=O)O-$ |
| 1 | 1 | 1 | 1 | 0 | $-C_4H_9$ | $-S-(CH_2)_2C(=O)OC_4H_9$ | $-S-(CH_2)_2C(=O)O-$ |
| 2 | 2 | 0 | 0 | 0 | — | $-S-(CH_2)_2OC(=O)-C_{17}H_{35}$ | $-S-CH_2-C(=O)O-$ |

TABLE II-continued

Compounds in accordance with formula (III), for example, may include but are not limited to mercaptoacetic acid, 2-mercaptopropionic acid, 2-mercaptobutyric acid, 2-mercaptopentanoic acid, 2-mercaptohexanoic acid, 2-mercaptooctanoic acid, 2-mercaptooleic acid, 2-mercaptostearic acid, 2-mercaptosuberic acid, 2-mercapto-2,3-dimethyl butyric acid, 2-mercapto-3-methyl butyric acid, 2-mercapto-4-methyl hexanoic acid, 2-mercapto-2-methyl butyric acid, 2-mercaptovaleric acid, 2-mercaptolauric acid, 2-mercapto-4-phenyl hexanoic acid, phenyl-2-mercaptoacetic acid, 2-mercapto-3-cyclohexyl propionic acid, 2-mercapto-2-ethyl hexanoic acid, 2-mercapto-2-propyl octanoic acid, 2-mercapto-2-butyl dodecanoic acid, 2,7-dimercapto-1,8-octanedioic acid, 2,5-dimercapto-1,6-hexanedioic acid, 2,9-dimercapto-1,10-decanedioic acid, 2,15-dimercapto-1,16-hexadecanedioic acid, 1,14-bis(1-mercapto-1-carboxyl methyl)benzene, 1,3,5-tris(1-mercapto-1-carboxyl methyl)benzene, 1,4-bis(1-mercapto-1-carboxyl-2-ethyl)benzene, 1,2,4,5-tetrakis(1-mercapto-1-carboxyl-2-ethyl)benzene, 1-methyl-4-(1-mercapto-1-carboxyl methyl)benzene, (1-mercapto-1-carboxyl methyl)benzene, (1-mercapto-1-carboxy-1-butyl)benzene, 1,4-bis(1-mercapto-1-carboxyl-1-dodecyl)benzene, 1-mercapto-1-carboxy-3-phenyl butane, tetrakis(1-mercapto-1-carboxyl methyl)methane, tris(1-mercapto-1-carboxyl-2-ethyl)methane, 1-mercapto-1-carboxyl-1-cyclohexyl methane, 1,4 bis(1-mercapto-1-carboxyl-2-ethyl)cyclohexane and 1-mercaptocyclohexane carboxylic acid.

The preferred 2-mercaptocarboxylic acids are 2-mercaptoacetic acid and 2-mercaptopropionic acid.

In the practice of the organic polymer compositions of this invention, there may be employed, for example, as the halogen containing organic polymer a halogenated polyolefin homopolymer, a halogenated polyolefin copolymer, a mixture containing a halogenated polyolefin homopolymer, a mixture containing a halogenated polyolefin copolymer, a vinyl halide homopolymer, a vinyl halide copolymer, a mixture containing a vinyl halide homopolymer or a mixture containing a vinyl halide copolymer. As vinyl halide homopolymers, vinyl halide copolymers and polymer blends containing vinyl halide homopolymers or vinyl halide copolymers usable in the practice of this invention there, for example, may be used (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylates, methyl alpha chloracrylate, styrene, vinyl ethers such as vinyl ethyl ether, vinyl chloroethyl ether, vinyl phenyl ether, vinyl ketones such as vinyl methyl ketone, vinyl phenyl ketone, 1 fluoro-1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadiene-styrene copolymer, and polyvinyl chloride and polyethylene and polymethyl methacrylate. Typical vinyl halide copolymers usuable in this invention include vinyl chloride-vinyl acetate (87:13), vinyl chloride-vinylidene chloride (95:5), vinyl chloride-diethylfumarate (95:5), vinyl chloride-trichloroethylene (95:5) and vinyl chloride-2-ethylhexyl acrylate (80:20). The polymer blends usable in the practice of this invention comprise physical blends of at least two distinct polymeric species and contain from 25 to 95 weight percent of vinyl halide homopolymer. The vinyl halide copolymers usable in the practice of this invention are copolymers comprising from 25 to 95 mole percent vinyl halide units.

The amount of elemental sulfur and the amount of 2-mercaptocarboxylic acid usable in the practice of the organic antimony stabilizer composition of this invention may vary over a wide range. The amount of elemental sulfur is not critical, it being only necessary to have at least an amount of elemental sulfur present which stabilizes the organic antimony compound to light and moisture. Although an amount of elemental sulfur larger than that amount which effectively stabilizes the organic antimony compound to light and moisture may be used, such larger amount is not necessary. The organic antimony composition of this invention contains preferably from 0.03% to 3.0% (more preferably from 0.05% to 0.20%) elemental sulfur by weight based on the weight of the organic antimony compound. It is desirable to have at least an amount of 2-mercaptocarboxylic acid present in the organic antimony stabilizer composition of this invention that provides a synergistic effect with the organic antimony compound in stabilizing a halogen containing polymer. An amount of 2-mercaptocarboxylic acid greater than a synergistically effective amount is usable, although usually not necessary. The organic antimony stabilizer composition in accordance with this invention contains preferably from 0.5% to 25%, more preferably from 3.0% to 5%, by weight of the 2-mercaptocarboxylic acid based on the weight of the organic antimony compound. In the practice of the organic polymer compositions of this invention the amount of organic antimony stabilizer composition used may vary over a wide range. It is only necessary that there be present in the organic polymer composition of this invention at least a stabilizingly effective amount of the organic antimony stabilizer composition. The amount of the organic antimony stabilizer composition used is preferably from 0.001% to 10%, more preferably from 0.01% to 5%, by weight based on the weight of the halogen containing organic polymer.

In the practice of the organic polymer composition of this invention there may be present, in addition to the halogen containing organic polymer and the organic antimony stabilizer composition, conventional additives such as fillers, pigments, plasticizers, dyes, lubricants, and ultraviolet light stabilizers well-known to the plastic art. Among the fillers, such materials as calcined clays, calcium carbonate, and talcs are used. Pigments well-known in the art can be used including such materials as titanium dioxide, carbon black and iron oxide. Included among the well-known plasticizers which are usuable are phthalates, sebacates, adipates, phosphates and fatty esters having between 16 to 150 carbon atoms. Lubricants well known in the art which may be used include hydrocarbon waxes, stearyl stearate, cetyl palmitate and other ester waxes, Stabilizers such as well-known ortho hydroxy benzophenones, hydroxy benezotriazoles, organotin carboxylates, organotin sulfides and organotin mercaptocarboxylic acid esters may be used. Antioxidants include tricresyl phosphite, 2,6-di-t-butyl-4-methyl phenol, 2,6-di-t-butyl-4-decyloxy phenol and 2-t-butyl-4-octadecyloxy phenol.

Organic antimony stabilizer compositions in accordance with this invention are advantageously useful in stabilizing halogen containing organic polymer, particularly in stabilizing such polymers against heat during processing and use. Articles of commerce such as are produced by injection and extrusion processes, for example pipe, can be made from the organic polymer composition of this invention by processes well known in the art.

Methods well-known in the art may be employed to prepare the organic antimony stabilizer composition of this invention, using conventional equipment. Thus for example the elemental sulfur may be mixed into the organic antimony compound followed thereafter by the addition thereto of the 2-mercaptocarboxylic acid. In an alternative method the organic antimony compound may be mixed with an inert liquid carrier, the elemental sulfur added and mixed into the resulting mixture and then the 2-mercaptocarboxylic added and blended into the resulting mixture. In another method the 2-mercaptocarboxylic acid may be added and blended into the organic antimony compound followed by the addition thereto and blending in of the elemental sulfur. A further method may be used wherein the elemental sulfur and 2-mercaptocarboxylic acid are mixed together and then the resulting mixture added and blended into the organic antimony compound. The adding and blending together of the organic antimony compound, elemental sulfur and 2-mercaptocarboxylic acid components of the organic antimony stabilizer composition of this invention may be carried out at room temperature or at convenient temperatures above room temperature. Preferably the elemental sulfur and the organic antimony compound, optionally in the presence of the 2-mercaptocarboxylic acid, are blended together at elevated temperatures (e.g. melting point of sulfur) to form a homogeneous mixture. More preferably, the elevated temperature blending of the organic antimony compound and elemental sulfur is carried out in the absence of the 2-mercaptocarboxylic acid and the 2-mercaptocarboxylic acid blended into the resulting homogeneous mixture at or near room temperature.

Organic polymer compositions according to this invention may be prepared by methods well known in the art and by the use of conventional equipment (e.g. Henschel blender). Thus, in accordance with one such method the organic antimony stabilizer composition may be added to the halogen containing organic polymer and blended together on a two roll mill. In another method the organic antimony stabilizer composition may be added to the halogen containing polymer with continuous blending in a Henschel blender. The important consideration is that the organic antimony stabilizer composition and halogen containing organic polymer be thoroughly blended together.

The following examples are presented to further describe the invention and the practice thereof and are not intended to be limiting on the invention or its practice. In the following examples, all amounts, ratios and percentages are by weight and temperatures in degrees Centigrade unless otherwise indicated.

The organic antimony compounds useful in the practice of this invention may be prepared by techniques well known in the art. The following example is illustrative of the manner in which the organic antimony compounds may be prepared.

EXAMPLE A

This example illustrates the preparation of phenylantimony di(isooctylthioglycolate) according to the following reaction scheme:

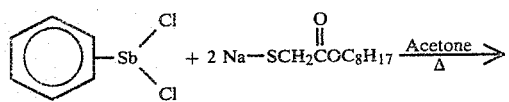

-continued

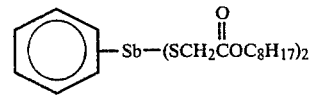

Dichlorophenylstibine (67.5 g, 0.250 mole), prepared by the reaction of phenylmagnesium bromide with antimony trichloride (see *J. Pharm. Belg.* 19, 133–269 (1937), and acetone (200 ml) are added to a one liter 2 neck round bottom flask equipped with mechanical stirrer and a 350 ml pressure equalizing addition funnel. The resulting solution is stirred and cooled to 10° C. A mixture of sodium isooctylthioglycolate (59.4 g, 0.263 mole) and acetone (250 ml) is prepared and added to the flask over a one-hour period. At the completion of this addition, the flask is equipped for heating and condensation and the resulting reaction mixture is refluxed for four hours. The resulting solution is then transferred to a one liter, single neck round bottom flask and the majority of the acetone is removed at reduced pressure (rotary evaporation) leaving a warm residue. This residue is triturated with two 200 ml portions of toluene, and the combined toluene extracts are filtered. The toluene is removed from the filtrate by evaporation under reduced pressure. Analysis indicates the remaining liquid product to be phenylantimony di(isooctylthioglycolate) which is obtained in a typical yield of 141 g or 93.2% of theoretical yield.

The following organic antimony compounds are representative of organic antimony compounds useful in the practice of this invention.

TABLE III

| Antimony Cmpd. No. | |
|---|---|
| 1 | $Sb(-S-\text{Ph})_3$ |
| 2 | $Sb(-S-\text{C}_6\text{H}_4-CH_3)_3$ |
| 3 | $Sb(-S-CH_2-\text{Ph})_3$ |
| 4 | $Sb(-S-\text{thienyl})_3$ |
| 5 | $Sb(-S(CH_2)_{10}CH_3)_3$ |
| 6 | $Sb(-S(CH_2)_5CH_3)_3$ |
| 7 | $Sb(-S-CH(CH_2)_3CH_3)_3$ <br> $\|$ <br> $CH_3$ |
| 8 | $Sb(-S-\text{cyclohexyl})_3$ |
| 9 | $Sb(-SCH_2\overset{O}{\underset{\|\|}{C}}OC_8H_{17})_3$ |
| 10 | $Sb(-SCH_2\overset{O}{\underset{\|\|}{C}}O-\text{Ph})_3$ |
| 11 | $Sb(-SCH_2\overset{O}{\underset{\|\|}{C}}OCH_3)_3$ |

TABLE III-continued

| Antimony Cmpd. No. | Structure |
|---|---|
| 12 | $Sb(-SCH_2\overset{O}{\overset{\|}{C}}C_{18}H_{37})_3$ |
| 13 | $Sb(-SCH_2\overset{O}{\overset{\|}{C}}OCH_2CH_2OCH_2CH_3)_3$ |
| 14 | $Sb(-SCH_2\overset{O}{\overset{\|}{C}}\text{-}\langle S \rangle)_3$ (thiophene) |
| 15 | $Sb(-SCH_2CH_2\overset{O}{\overset{\|}{C}}C_8H_{17})_3$ |
| 16 | $Sb(-S(CH_2)_4\overset{O}{\overset{\|}{C}}C_8H_{17})_3$ |
| 17 | $\text{Ph}-Sb(-SCH_2\overset{O}{\overset{\|}{C}}C_8H_{17})_2$ |
| 18 | $(\text{Ph})_2-Sb-SCH_2\overset{O}{\overset{\|}{C}}C_8H_{17}$ |
| 19 | $CH_3(CH_2)_3-Sb(-SCH_2\overset{O}{\overset{\|}{C}}C_8H_{17})_2$ |
| 20 | $(CH_3-\underset{CH_3}{\overset{}{CH}}CH_2)_2-Sb-SCH_2\overset{O}{\overset{\|}{C}}C_8H_{17}$ |
| 21 | $CH_3-Sb(-SCH_2\overset{O}{\overset{\|}{C}}C_8H_{17})_2$ |
| 22 | $(CH_3)_2-Sb-SCH_2\overset{O}{\overset{\|}{C}}C_8H_{17}$ |
| 23 | $CH_3-Sb(-SCH_2\overset{O}{\overset{\|}{C}}CH_3)_2$ |
| 24 | $(CH_3)_2-Sb-CH_2\overset{O}{\overset{\|}{C}}CH_3$ |
| 25 | $CH_3-Sb(-SCH_2\overset{O}{\overset{\|}{C}}C_{18}H_{37})_2$ |
| 26 | $(CH_3)_2-Sb-SCH_2\overset{O}{\overset{\|}{C}}C_{18}H_{37}$ |
| 27 | $CH_3-\underset{\underset{O}{\overset{\|}{SCH_2COC_8H_{17}}}}{\overset{}{Sb}}-SCH_2\overset{O}{\overset{\|}{C}}OCH_2CH_2O\overset{O}{\overset{\|}{C}}CH_2S-\underset{\underset{O}{\overset{\|}{SCH_2COC_8H_{17}}}}{\overset{}{Sb}}-CH_3$ |
| 28 | $(C_8H_{17}O\overset{O}{\overset{\|}{C}}CH_2S)_2-Sb-SCH_2\overset{O}{\overset{\|}{C}}OCH_2CH_2O\overset{O}{\overset{\|}{C}}CH_2S-Sb(-SCH_2\overset{O}{\overset{\|}{C}}C_8H_{17})_2$ |
| 29 | $(C_8H_{17}O\overset{O}{\overset{\|}{C}}CH_2S)_2-Sb-SCH_2\overset{O}{\overset{\|}{C}}O\underset{CH_3}{\overset{}{CH}}\underset{CH_3}{\overset{}{CH}}O\overset{O}{\overset{\|}{C}}CH_2S-Sb(-SCH_2\overset{O}{\overset{\|}{C}}C_8H_{17})_2$ |
| 30 | $(C_8H_{17}O\overset{O}{\overset{\|}{C}}CH_2S)_2-Sb-SCH_2\overset{O}{\overset{\|}{C}}O\underset{C_2H_5}{\overset{}{CH}}O\overset{O}{\overset{\|}{C}}CH_2S-Sb(-SCH_2\overset{O}{\overset{\|}{C}}C_8H_{17})_2$ |
| 31 | $(C_8H_{17}O\overset{O}{\overset{\|}{C}}CH_2S)_2-Sb-SCH_2\overset{O}{\overset{\|}{C}}OCH-CH-O\overset{O}{\overset{\|}{C}}CH_2S-Sb(-SCH_2\overset{O}{\overset{\|}{C}}C_8H_{17})_2$ (with cyclohexane bridge -CH_2-CH_2-CH_2-CH_2-) |
| 32 | $(C_8H_{17}O\overset{O}{\overset{\|}{C}}CH_2S)_2-Sb-SCH_2\overset{O}{\overset{\|}{C}}O\text{-}(o\text{-phenylene})\text{-}O\overset{O}{\overset{\|}{C}}CH_2S-Sb(-SCH_2\overset{O}{\overset{\|}{C}}C_8H_{17})_2$ |
| 33 | $(C_8H_{17}O\overset{O}{\overset{\|}{C}}CH_2S)_2-Sb-SCH_2\overset{O}{\overset{\|}{C}}O\text{-}(4\text{-}t\text{-butyl-}o\text{-phenylene})\text{-}O\overset{O}{\overset{\|}{C}}CH_2S-Sb(-SCH_2\overset{O}{\overset{\|}{C}}C_8H_{17})_2$ |
| 34 | $CH_3O\overset{O}{\overset{\|}{C}}CH_2S-\underset{\text{Ph}}{\overset{}{Sb}}-SCH_2\overset{O}{\overset{\|}{C}}OCH_2CH_2O\overset{O}{\overset{\|}{C}}CH_2S-\underset{\text{Ph}}{\overset{}{Sb}}-SCH_2\overset{O}{\overset{\|}{C}}CH_3$ |

LIGHT STABILITY TEST PROCEDURE

A clear, liquid mixture of organic antimony compound, sulfur and 2-mercaptocarboxylic acid is weighed (10 g.) into a small, clear glass screw-capped vial. To a separate vial is added an equivalent amount of the same organic antimony compound alone. Both vials are sealed and placed into a light exposure chamber (Mac-Beth Model EBX-222) equipped with a light source which emits radiation only in the ultraviolet portion of the electromagnetic spectrum. The chamber is closed and UV exposure of the samples is initiated. Periodically, the radiation is discontinued and the samples are examined for decomposition. Decomposition is detected by suspended solids, precipitate formation or by a blackened appearance of the sample. The number of hours of exposure required before sample decomposition occurs is designated as UV stability. The results of several light stability tests on organic antimony compounds alone and in combination with sulfur and a 2-mercaptocarboxylic acid are indicated in Table IV.

TABLE IV

| Example No. | Composition | pbw* | UV Stability (Hrs.) |
|---|---|---|---|
| 1 | Antimony cmpd. No. 3 from Table III. | — | 1 |
| 2 | Antimony cmpd. No. 3 from Table III. | 100 | |
| | $CH_3OC(CH_2)_4CHCOOH$ with $\parallel O$ and $\mid SH$ | 4.67 | 5 |
| | Sulfur | 0.14%** | |
| 3 | Antimony cmpd. No. 4 from Table III. | — | 3 |
| 4 | Antimony cmpd. No. 4 from Table III. | 100 | |
| | $CH_3(CH_2)_3CHCOOH$ with $\mid SH$ | 6.67 | 32 |
| | Sulfur | 0.14% | |
| 5 | Antimony cmpd. No. 9 from Table III. | — | 1 |
| 6 | Antimony cmpd. No. 9 from Table III. | 100 | |
| | $HSCH_2COOH$ | 4.68 | 25 |
| | Sulfur | 0.14% | |
| 7 | Antimony cmpd. No. 11 from Table III. | — | 1 |
| 8 | Antimony cmpd. No. 11 from Table III. | 100 | |
| | $C_8H_{17}OCCH_2CHCOOH$ with $\parallel O$ and $\mid SH$ | 13.3 | 20 |
| | Sulfur | 0.13% | |
| 9 | Antimony cmpd. No. 17 from Table III. | — | 1 |
| 10 | Antimony cmpd. No. 17 from Table III. | 100 | |
| | Ph-CHCOOH with $\mid SH$ | 6.65 | 9 |
| | Sulfur | 0.47% | |
| 11 | Antimony cmpd. No. 29 from Table III. | — | 1 |
| 12 | Antimony cmpd. No. 29 from Table III. | 100 | |
| | $CH_3CHCOOH$ with $\mid SH$ | 3.33 | 19 |
| | Sulfur | 0.34% | |
| 13 | Antimony cmpd. No. 9 from Table III. | 100 | |
| | $HSCH_2COOH$ | 4.68 | 1 |

*part by weight.
**The amount of sulfur in the composition is expressed as a weight percent based on the weight of the antimony compound.

HYDROLYSIS STABILITY TEST PROCEDURE

A clear liquid mixture of organic antimony compound, sulfur and 2-mercaptocarboxylic acid is weighed (20 g.) into a small glass vial. To a separate vial is added an equivalent amount of the same organic antimony compound alone. Both unsealed vials are placed upright into a glass dessicator which contains a 100 ml beaker filled with distilled water. The dessicator is sealed and placed into a dark environment. Periodically, the desiccator is removed from the dark and the samples are visually inspected. A sample is determined to have failed the hydrolysis test when haziness, suspended solids or a precipitate is detected in the solution. The number of exposure hours before sample failure occurs is designated as the sample's hydrolytic stability.

The results of several hydrolysis stability tests on organic antimony compounds alone and in combination with sulfur and a 2-mercaptocarboxylic acid are indicated in Table V below.

TABLE V

| Example No. | Composition | pbw* | Hydrolytic Stability (Hrs.) |
|---|---|---|---|
| 14 | Antimony cmpd. No. 2 from Table III. | — | 22 |
| 15 | Antimony cmpd. No. 2 from Table III. | 100 | |
| | $HSCHCOOH$ with $\mid CH_3$ | 2.67 | 167 |
| | Sulfur | 0.15%** | |
| 16 | Antimony cmpd. No. 3 from Table III. | — | 40 |
| 17 | Antimony cmpd. No. 3 from Table III. | 100 | |
| | $CH_3OC(CH_2)_4CHCOOH$ with $\parallel O$ and $\mid SH$ | 4.67 | 285 |
| | Sulfur | 0.14% | |
| 18 | Antimony cmpd. No. 9 from Table III. | — | 49 |
| 19 | Antimony cmpd. No. 9 from Table III. | 100 | |
| | $HSCH_2COOH$ | 4.68 | 350 |
| | Sulfur | 0.14% | |
| 20 | Antimony cmpd. No. 20 from Table III. | — | 69 |
| 21 | Antimony cmpd. No. 20 from Table III. | 100 | |
| | $HSCHCOOH$ with $\mid CH_3$ | 3.33 | 430 |
| | Sulfur | 0.48% | |
| 22 | Antimony cmpd. No. 34 Table III. | — | 64 |
| 23 | Antimony cmpd. No. 34 from Table III. | 100 | |
| | $C_8H_{17}OCCH_2CHCOOH$ with $\parallel O$ and $\mid SH$ | 6.67 | 385 |
| | Sulfur | 0.14% | |
| 24 | Antimony cmpd. No. 9 from Table III. | 100 | |
| | $HSCH_2COOH$ | 4.68 | 37 |

*parts by weight.
**The amount of sulfur in the composition is expressed as a weight percent based on the weight of the antimony compound.

DYNAMIC MILL STABILITY TEST

Several mixtures are prepared by mixing 100 parts of polyvinyl chloride (Geon ® 103 sold by B. F. Goodrich Chemical Co.) with 1.00 part $TiO_2$, 3.00 parts OMYA ® 90T (fine particle $CaCO_3$ coated with calcium stearate), 1.20 parts ADVAWAX ® 165 paraffin wax (sold by Carstab Corporation), 0.15 part AC 629A (oxidized low molecular weight ethylene homopolymer available from Allied Chemical Corp.), and each in turn of the stabilizer compositions shown in Table VI below in the amounts indicated in Table VII below.

Each mixture is processed in turn on a 2 roll mill at a roll temperature of 193° C. and roll speeds of 40 revolutions per minute (RPM) for the front roll and 30 RPM for the rear roll. Samples are removed from the rolls at one minute intervals for visual appearance and color evaluation using the following numerical color scale:

| bright white | white | light yellow | yellow | tan | brown |
|---|---|---|---|---|---|
| 10 | 9 | 8 | 7 | 6 | 5 |

The results of these evaluations are indicated in Table VII below:

TABLE VI

| Stabilizer Designation | Ingredients | pbw* |
|---|---|---|
| A | Antimony cmpd. No. 9 from Table III. | — |
| B | Antimony cmpd. No. 9 from Table III. | 100 |
|   | HSCH$_2$COOH | 4.68 |
| C | Antimony cmpd. No. 9 from Table III. | 100 |
|   | HSCH$_2$COOH | 4.67 |
|   | Sulfur | 0.14%** |
| D | Antimony cmpd. No. 9 from Table III. | 100 |
|   | HSCH$_2$COOH | 4.68 |
|   | Sulfur | 2.4% |
| E | Antimony cmpd. No. 15 from Table III. | — |
| F | Antimony cmpd. No. 15 from Table III. | 100 |
|   | $$\underset{\mathrm{SH}}{\mathrm{CH_3OC(CH_2)_4\overset{|}{C}HCOOH}}\;\;\;\overset{\mathrm{O}}{\overset{\|}{\phantom{C}}}$$ | 4.67 |
|   | Sulfur | 0.14% |
| G | Antimony cmpd. No. 13 from Table III. | — |
| H | Antimony cmpd. No. 13 from Table III. | 100 |
|   | HOOCCH$_2$CHCOOH with SH | 6.65 |
|   | Sulfur | 0.14% |
| I | Antimony cmpd. No. 3 from Table III. | — |
| J | Antimony cmpd. No. 3 from Table III. | 100 |
|   | $$\underset{\mathrm{SH}}{\mathrm{CH_3OC(CH_2)_4\overset{|}{C}HCOOH}}$$ | 4.67 |
|   | Sulfur | 0.14% |
| K | Antimony cmpd. No. 17 from Table III. | — |
| L | Antimony cmpd. No. 17 | 100 |

TABLE VI-continued

| Stabilizer Designation | Ingredients | pbw* |
|---|---|---|
|   | from Table III. |   |
|   | C$_6$H$_5$—CHCOOH with SH | 6.65 |
|   | Sulfur | 0.47% |
| M | Antimony cmpd. No. 29 from Table III. | — |
| N | Antimony cmpd. No. 29 from Table III. | 100 |
|   | CH$_3$CHCOOH with SH | 3.33 |
|   | Sulfur | 0.34% |

*pbw = parts by weight.
**Amount of sulfur is expressed as weight percent based on the weight of the antimony compound.

TABLE VII

| Stabilizer Composition From Table VI | phr* | Minutes of Milling COLOR |   |   |   |   |   |   |   |   |   |
|---|---|---|---|---|---|---|---|---|---|---|---|
|   |   | 1 | 2 | 3 | 4 | 5 | 6 | 7 | 8 | 9 | 10 |
| A | 0.263 | 10 | 9 | 9 | 9 | 8 | 8 | 7 | 7 | 6 | 5 |
| B | 0.263 | 10 | 10 | 10 | 9 | 9 | 8 | 8 | 7 | 7 | 6 |
| C | 0.263 | 10 | 10 | 10 | 9 | 9 | 8 | 8 | 7 | 6 | 6 |
| D | 0.263 | 9 | 9 | 8 | 8 | 7 | 7 | 6 | 6 | 5 |   |
| E | 0.263 | 10 | 9 | 9 | 8 | 8 | 7 | 7 | 6 | 6 | 5 |
| F | 0.263 | 10 | 10 | 9 | 9 | 9 | 8 | 8 | 7 | 6 | 6 |
| G | 0.263 | 10 | 10 | 9 | 9 | 9 | 8 | 8 | 7 | 6 | 6 |
| H | 0.263 | 10 | 10 | 10 | 9 | 9 | 9 | 8 | 8 | 7 | 6 |
| I | 0.263 | 9 | 9 | 8 | 8 | 8 | 7 | 7 | 7 | 6 | 5 |
| J | 0.263 | 9 | 9 | 9 | 8 | 8 | 8 | 7 | 7 | 7 | 6 |
| K | 0.263 | 10 | 9 | 9 | 9 | 9 | 8 | 8 | 7 | 7 | 6 |
| L | 0.263 | 10 | 10 | 9 | 9 | 9 | 8 | 8 | 7 | 7 | 6 |
| M | 0.263 | 10 | 10 | 9 | 9 | 8 | 8 | 8 | 7 | 7 | 6 |
| N | 0.263 | 10 | 10 | 10 | 9 | 9 | 9 | 8 | 8 | 7 | 6 |
| A | 0.315 | 10 | 10 | 9 | 9 | 9 | 8 | 8 | 7 | 7 | 6 |
| C | 0.315 | 10 | 10 | 9 | 9 | 9 | 9 | 8 | 8 | 7 | 7 |

*phr = parts of stabilizer per hundred parts of polyvinyl chloride.

What we claim and desire to protect by Letters Patent is:

1. A composition comprising:
   A. At least one organic antimony compound containing at least one antimony to sulfur to carbon linkage and being selected from compounds having the formulas:

(I)

and

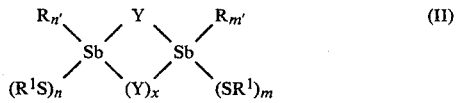

(II)

wherein
   R is selected from the group consisting of alkyl, aryl, cycloalkyl, cycloalkenyl, aralkyl, alkaryl, and alkenyl;
   R$^1$ is selected from the group consisting of alkyl, aryl, cycloalkyl, cycloalkenyl, aralkyl, alkaryl, alkenyl,

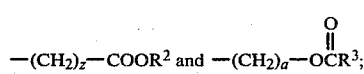

$R^2$ is hydrogen, alkyl, aryl, alkenyl, cycloalkyl or alkoxyalkyl;

$R^3$ is alkyl, aryl, cycloalkyl or alkenyl;

Y is selected from the group consisting of

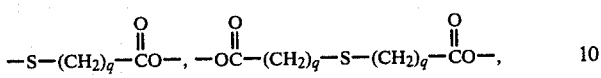

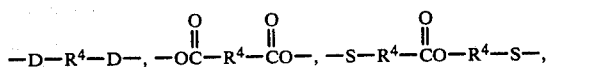

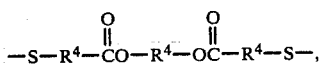

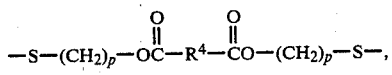

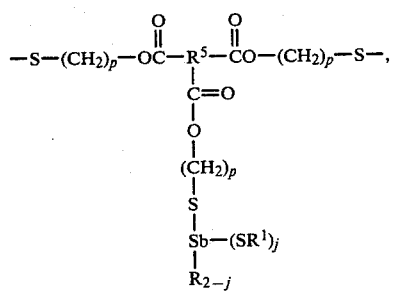

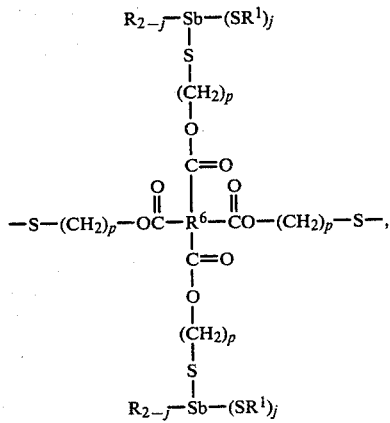

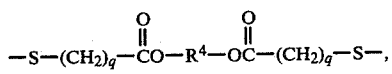

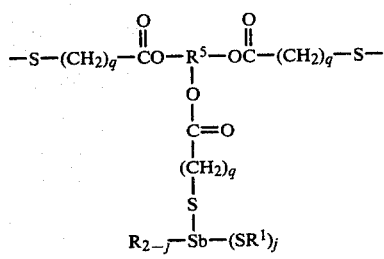

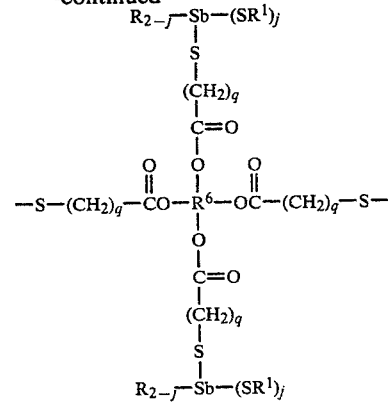

$R^4$ is alkylene, arylene, or alkenylene;
$R^5$ is a trivalent alkyl or aryl radical;
$R^6$ is a tetravelent alkyl or aryl radical;
D is oxygen or sulfur;
i = 1, 2 or 3;
j = 1 or 2;
m = 1 or 2 and m' = 0 or 1;
n = 1 or 2 and n' = 0 or 1;
x is 0 or 1 with the proviso that when x=0 then m+m'=2 and n+n'=2, and when x=1 then m=1, m'=0, n=1 and n'=0;
z is 1, 2 or 3;
a is 2, 3 or 4;
q is 1, 2 or 3; and
p is 2, 3 or 4;
B. elemental sulfur in an amount from about 0.03% to about 3.0% by weight based on the weight of the organic antimony compound; and
C. in an amount from about 0.5% to about 25% by weight based on the weight of the organic antimony compound of at least one 2-mercaptocarboxylic acid selected from compounds having the formula:

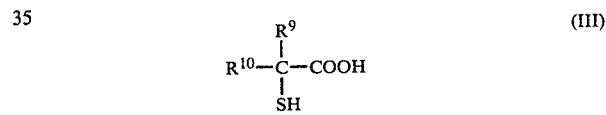

where $R^9$ and $R^{10}$ are the same or different and are selected from hydrogen, alkyl, aryl, aralkyl, alkaryl, cycloalkyl, alkenyl, carboxyl,

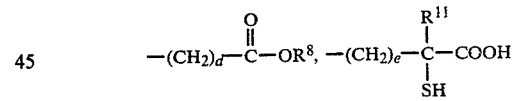

where $R^8$ is hydrogen, alkyl, aryl, aralkyl, alkaryl, cycloalkyl, cycloalkenyl, or alkenyl; $R^{11}$ is hydrogen, alkyl or aryl; d is 1 to 6 and e is 1 to 10; or $R^9$ and $R^{10}$ together form an alicyclic ring.

2. The composition of claim 1 wherein the organic antimony compound is a compound according to formulas (I) or (II) wherein $R^1$ is selected from $C_1$-$C_{18}$ alkyl, phenyl, cyclohexyl,

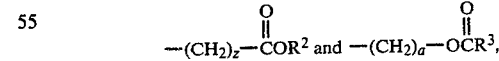

and i=2 or 3, m=2, n=2, x=0.

3. The composition of claim 1 wherein the 2-mercaptocarboxylic acid is selected from 2-mercaptoacetic acid and 2-mercaptopropionic acid.

4. The composition of claim 1 wherein the organic antimony compound is a compound according to formula (I) wherein $R^1$ is

and i=3.